(12) United States Patent
Agrawal et al.

(10) Patent No.: US 12,368,571 B1
(45) Date of Patent: Jul. 22, 2025

(54) COMPUTING SYSTEM FOR FULLY HOMOMORPHIC ENCRYPTION APPLICATIONS USING PARALLELIZABLE HYBRID BOOTSTRAPPING

(71) Applicant: Trustees of Boston University, Boston, MA (US)

(72) Inventors: Rashmi S. Agrawal, Cambridge, MA (US); Ajay J. Joshi, Lexington, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 19/056,084

(22) Filed: Feb. 18, 2025

Related U.S. Application Data

(60) Provisional application No. 63/562,483, filed on Mar. 7, 2024.

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC ............................... H04L 9/008; H04L 9/0618
See application file for complete search history.

(56) References Cited

U.S. PATENT DOCUMENTS

| | | | |
|---|---|---|---|
| 8,515,058 B1 * | 8/2013 | Gentry | H04L 9/008 380/28 |
| 12,200,101 B2 | 1/2025 | Agrawal et al. | |
| 2005/0228643 A1 * | 10/2005 | Munteanu | G06F 40/42 704/9 |
| 2021/0241166 A1 * | 8/2021 | Horesh | G06F 21/602 |
| 2022/0085970 A1 * | 3/2022 | Al Badawi | G06F 7/724 |

(Continued)

FOREIGN PATENT DOCUMENTS

CN 117643012 3/2024

OTHER PUBLICATIONS

Agrawal, et al.; "MAD: Memory-Aware Design Techniques for Accelerating Fully Homomorphic Encryption," MICRO '23, October 28-Nov. 1, 2023, Toronto, ON, Canada, pp. 685-397.

(Continued)

*Primary Examiner* — Meng Li
(74) *Attorney, Agent, or Firm* — BainwoodHuang

(57) ABSTRACT

A computing system includes accelerator devices for hardware acceleration of operations of a fully homomorphic encryption (FHE) application, including a hybrid bootstrapping operation that may be parallelized for increased performance. Hybrid bootstrapping includes a first extraction on a first ciphertext (e.g., Ring Learning with Errors or RLWE) to form a plurality of second ciphertexts (e.g., LWE) corresponding to respective elements of the encrypted data, and a plurality of blind-rotate operations performed independently on the respective second ciphertexts to collectively produce a plurality of third ciphertexts (e.g., RLWE). A second extraction of respective elements of the third ciphertexts forms a plurality of fourth ciphertexts (e.g., LWE), and a repacking of respective elements of the fourth ciphertexts recreates the first-ciphertext representation of the encrypted data with restored modulus and reduced noise.

11 Claims, 6 Drawing Sheets

(56) References Cited

U.S. PATENT DOCUMENTS

| | | | | |
|---|---|---|---|---|
| 2023/0119749 | A1* | 4/2023 | Micciancio | H04L 9/0618 380/277 |
| 2024/0048355 | A1 | 2/2024 | Joye | |
| 2024/0171371 | A1* | 5/2024 | Bottleson | H04L 9/0618 |
| 2024/0313945 | A1* | 9/2024 | Choi | H04L 9/3093 |
| 2024/0340158 | A1* | 10/2024 | Choi | H04L 9/06 |
| 2024/0421971 | A1* | 12/2024 | Agrawal | H04L 9/008 |
| 2025/0106005 | A1* | 3/2025 | Kim | H04L 9/0631 |

OTHER PUBLICATIONS

Agrawal, et al.; "FAB: An FPGA-based Accelerator for Bootstrappable Fully Homomorphic Encryption," 2023 IEEE International Symposium on High-Performance Computer Architecture (HPCA), downloaded on May 5, 2025 from IEEE Xplore, DOI: 10.1109/HPCA56546.2023.10070953, pp. 882-895.

Badawi, et al.; "OpenFHE: Open-Source Fully Homomorphic Encryption Library," in Proceedings of the 10th Workshop on Encrypted Computing & Applied Homomorphic Cryptography, WAHC '22, Nov. 7, 2022, Los Angeles, CA, pp. 53-63.

Barrett; "Implementing the Rivest Shamir and Adleman Public Key Encryption Algorithm On a Standard Digital Signal Processor," Computer Security LTD, Aug. 1996, A.M. Odlyzko (Ed.): Advances in Cryptology—CRYPTO '86, LNCS 263, Springer-Verlag Berlin Heidelberg 1987, pp. 311-323.

Bos, et al.; "Sieving for Shortest Vectors in Ideal Lattices: A Practical Perspective," International Journal of Applied Cryptography, vol. 3, No. 4, pp. 313-329, 2017.

Bossuat, et al.; "Efficient Bootstrapping for Approximate Homomorphic Encryption with Non-Sparse Keys," in Advances in Cryptology—EUROCRYPT 2021, A. Canteaut and F .- X. Standaert, Eds. Cham: Springer International Publishing, 2021, pp. 587-617.

Boura, et al.; "CHIMERA: Combining Ring-LWE-based Fully Homomorphic Encryption Schemes," Journal of Mathematical Cryptology, vol. 14, No. 1, pp. 316-338, 2020, [Online]. Available: https://doi.org/10.1515/jmc-2019-0026.

Bourse, et al.; "Fast Homomorphic Evaluation of Deep Discretized Neural Networks," in Advances in Cryptology—CRYPTO 2018: 38th Annual International Cryptology Conference, Santa Barbara, Ca, USA, Aug. 19-23, 2018, Proceedings, Part III 38. Springer, 2018, pp. 483-512.

Brakerski, et al.; "Fully Homomorphic Encryption without Bootstrapping," in ITCS '12, 2012, material based on research sponsored by DARPA under agreement No. FA8750-11-2-0225., pp. 1-27.

Chen, et al.; "Improved Bootstrapping for Approximate Homomorphic Encryption," in Advances in Cryptology—EUROCRYPT 2019, Y. Ishai and V. Rijmen, Eds. Cham: Springer International Publishing, 2019, pp. 34-54.

Chen, et al.; "Efficient Homomorphic Conversion Between (Ring) LWE Ciphertexts," in International Conference on Applied Cryptography and Network Security. Springer, 2021, pp. 460-479.

Cheon, et al.; "Bootstrapping for Approximate Homomorphic Eencryption," in Annual International Conference on the Theory and Applications of Cryptographic Techniques. Springer, 2018, pp. 360-384.

Cheon, et al.; "A Full RNS Variant of Approximate Homomorphic Encryption," in Selected Areas in Cryptography—SAC 2018, C. Cid and M. J. Jacobson Jr., Eds. Cham: Springer International Publishing, 2019, pp. 347-368.

Cheon, et al.; "A Hybrid of Dual and Meet-in-the-Middle Attack on Sparse and Ternary Secret Lwe," IEEE Access, vol. 7, pp. 89497-89506, 2019.

Cheon, et al.; "Homomorphic Encryption for Arithmetic of Approximate Numbers," in Advances in Cryptology—ASIACRYPT 2017, T. Takagi and T. Peyrin, Eds. Cham: Springer International Publishing, 2017, pp. 409-437.

Chillotti, et al.; "TFHE: Fast Fully Homomorphic Encryption Over the Torus," Journal of Cryptology, vol. 33, No. 1, pp. 34-91, 2020.

Chillotti, et al.; "Concrete: Concrete Operates on Ciphertexts Rrapidly by Extending TFHE," in WAHC 2020-8th Workshop on Encrypted Computing & Applied Homomorphic Cryptography, 2020, pp. 1-6.

Chillotti, et al.; "Programmable Bootstrapping Enables Efficient Homomorphic Inference of Deep Neural Networks," in Cyber Security Cryptography and Machine Learning: 5th International Symposium, CSCML 2021, Be'er Sheva, Israel, Jul. 8-9, 2021, Proceedings 5. Springer, 2021, pp. 1-19.

Dai, et al.; "Cuhe: A Homomorphic Encryption Accelerator Library," in Cryptography and Information Security in the Balkans: Second International Conference, BalkanCryptSec 2015, Koper, Slovenia, Sep. 3-4, 2015, Revised Selected Papers 2. Springer, 2016, pp. 169-186.

Castro, et al.; "Does Fully Homomorphic Encryption Need Compute Acceleration?" 2021. [Online]. Available: https://arxiv.org/abs/2112.06396, pp. 1-16.

Gener, et al.; "An FPGA-Based Programmable Vector Engine for Fast Fully Homomorphic Encryption Over the Torus," in SPSL: Secure and Private Systems for Machine Learning (ISCA Workshop), 2021, pp. 1-7.

Gentry; "A Fully Homomorphic Encryption Scheme," Stanford university, 2009, pp. 1-209.

Guimaraes, et al.; "Revisiting the Functional Bootstrap in TFHE," IACR Transactions on Cryptographic Hardware and Embedded Systems, pp. 229-253, 2021.

Halevi, et al.; "An Improved RNS Variant of the BFV Homomorphic Encryption Scheme," in Topics in Cryptology—CTRSA 2019—The Cryptographers' Track at the RSA Conference 2019, Proceedings, M. Matsui, Ed. Germany: Springer Verlag, 2019, pp. 83-105.

Halevi, et al.; "Algorithms in Helib," in Advances in Cryptology—CRYPTO 2014, J. A. Garay and R. Gennaro, Eds. Berlin, Heidelberg: Springer Berlin Heidelberg, 2014, pp. 554-571.

Halevi, et al.; "Faster Homomorphic Linear Transformations in Helib," in Advances in Cryptology—CRYPTO 2018—38th Annual International Cryptology Conference, Santa Barbara, CA, USA, Aug. 19-23, 2018, Proceedings, Part I, ser. Lecture Notes in Computer Science, H. Shacham and A. Boldyreva, Eds., vol. 10991. Springer, 2018, pp. 93-120. [Online]. Available: https://doi.org/10.1007/978-3-319-96884-1\_4.

Han, et al.; "Efficient Logistic Regression on Large Encrypted Data," Cryptology ePrint Archive, 2018, pp. 1-31.

Han, et al.; "Better Bootstrapping for Approximate Homomorphic Encryption," in Topics in Cryptology—CT-RSA 2020, S. Jarecki, Ed. Cham: Springer International Publishing, 2020, pp. 364-390.

Han, et al.; "coxHE: A Software-Hardware Co-Design Framework for FPGA Acceleration of Homomorphic Computation," in 2022 Design, Automation & Test in Europe Conference & Exhibition (Date). IEEE, 2022, pp. 1353-1358.

Jiang, et al.; "Matcha: A fast and Energy-Efficient Accelerator for Fully Homomorphic Encryption Over the Torus," in Proceedings of the 59th ACM/IEEE Design Automation Conference, 2022, pp. 235-240.

Jung, et al.; "Over 100x Faster Bootstrapping in Fully Homomorphic Encryption Through Memory-centric Optimization with GPUs," IACR Transactions on Cryptographic Hardware and Embedded Systems, vol. 2021, No. 4, p. 114-148, Aug. 2021. [Online]. Available: https://tches.iacr.org/index.php/TCHES/article/view/9062.

Kim, et al.; "General Bootstrapping Approach for RLWE-Based Homomorphic Encryption," Sep. 27, 2021, IEEE Transactions on Computers, 2023, pp. 1-28.

Kim, et al.; "Sharp: A Short-Word Hierarchical Accelerator for Robust and Practical Fully Homomorphic Encryption," in Proceedings of the 50th Annual International Symposium on Computer Architecture, 2023, pp. 1-15.

Kim, et al.; "Ark: Fully Homomorphic Encryption Accelerator with Runtime Data Generation and Inter-Operation Key Reuse," 2022 55th IEEE/ACM International Symposium on Microarchitecture, arXiv preprint arXiv:2205.00922, 2022, pp. 1237-1254.

Kim et al.; "BTS: An Accelerator for Bootstrappable Fully Homomorphic Encryption," ISCA '22, Jun. 18-22, 2022, New York, NY, ACM ISBN 978-1-4503-8610—Apr. 22, 2006, https://doi.org/10.1145/3470496.3527415, pp. 711-725.

(56) References Cited

OTHER PUBLICATIONS

Lee, et al.; "Privacy-Preserving Machine Learning with Fully Homomorphic Encryption for Deep Neural Network," IEEE Access, vol. 10, p. 30039-30054, 2022.

Lu, et al.; "Pegasus: Bridging Polynomial and Non-Polynomial Evaluations in Homomorphic Encryption," in 2021 IEEE Symposium on Security and Privacy (SP). IEEE, 2021, pp. 1057-1073.

Lyubashevsky, et al.; "On Ideal Lattices and Learning with Errors Over Rings," in Advances in Cryptology—EUROCRYPT 2010, H. Gilbert, Ed. Berlin, Heidelberg: Springer Berlin Heidelberg, Jun. 25, 2013, pp. 1-34.

Micciancio, et al.; "Ring Packing and Amortized FHEW Bootstrapping," Cryptology ePrint Archive, May 29, 2018, pp. 1-25.

Morshed, et al.; "CPU and GPU Accelerated Fully Homomorphic Encryption," in 2020 IEEE International Symposium on Hardware Oriented Security and Trust (HOST). IEEE, 2020, pp. 142-153.

Nam, et al.; "Accelerating N-bit Operations Over TFHE on Commodity CPU-FPGA," in Proceedings of the 41st IEEE/ACM International Conference on Computer-Aided Design, 2022, pp. 1-9.

Norton, et al.; "Parallelization and Performance Analysis of the Cooley-Tukey FFT Algorithm for Shared-Memory Architectures," IEEE Transactions on Computers, vol. 100, No. 5, pp. 581-591, 1987.

Putra, et al.; "Strix: An End-to-End Streaming Architecture with Two-Level Ciphertext Batching for Fully Homomorphic Encryption with Programmable Bootstrapping," arXiv preprint arXiv:2305.11423, May 19, 2023, pp. 1-14.

Riazi, et al.; "Heax: An Architecture for Computing on Encrypted Data," in Proceedings of the Twenty-Fifth International Conference on Architectural Support for Programming Languages and Operating Systems, Mar. 16-20, 2020, pp. 1295-1309.

Feldmann, et al.; "F1: A Fast and Programmable Accelerator for Fully Homomorphic Encryption," in MICRO-54: 54th Annual IEEE/ACM International Symposium on Microarchitecture, ser. MICRO '21. Oct. 18-22, 2021, New York, NY, USA: Association for Computing Machinery, 2021, p. 238-252. [Online]. Available: https://doi.org/10.1145/3466752.3480070.

Samardzic, et al.; "Craterlake: A Hardware Accelerator for Efficient Unbounded Computation on Encrypted Data," in Proceedings of the 49th Annual International Symposium on Computer Architecture, 2022, pp. 173-187.

Kaustubh, et al.; "GME: GPU-Based Microarchitectural Extensions to Accelerate Homomorphic Encryption," MICRO'23, Oct. 28-Nov. 1, 2023, Toronto, ON, Canada, 2023, pp. 670-684.

Son, et al.; "Revisiting the Hybrid Attack on Sparse Secret LWE" in Proceedings of the 7th ACM Workshop on Encrypted Computing & Applied Homomorphic Cryptography, ser. WAHC'19. New York, NY, USA: Association for Computing Machinery, 2019, p. 1-23. [Online]. Available: https://doi.org/10.1145/3338469.3358941.

Takeshita, et al.; "Accelerating Finite-Field and Torus Fully Homomorphic Encryption via Compute-Enabled (S) Ram," IEEE Transactions on Computers, pp. 1-14, 2023.

Turan, et al.; "HEAWS: An Accelerator for Homomorphic Encryption on the Amazon AWS FPGA," IEEE Transactions on Computers, vol. 69, No. 8, pp. 1185-1196, 2020.

Xin, et al.; "A Multi-Layer Parallel Hardware Architecture for Homomorphic Computation in Machine Learning," in 2021 IEEE International Symposium on Circuits and Systems (ISCAS). IEEE, 2021, pp. 1-5.

Ye, et al.; "FPGA Acceleration of Fully Homomorphic Encryption Over the Torus," in 2022 IEEE High Performance Extreme Computing Conference (HPEC). IEEE, 2022, pp. 1-7.

* cited by examiner

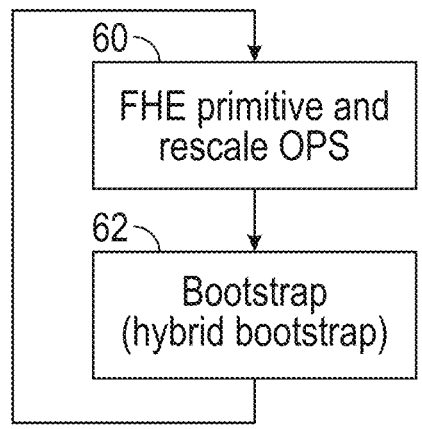
FIG. 5
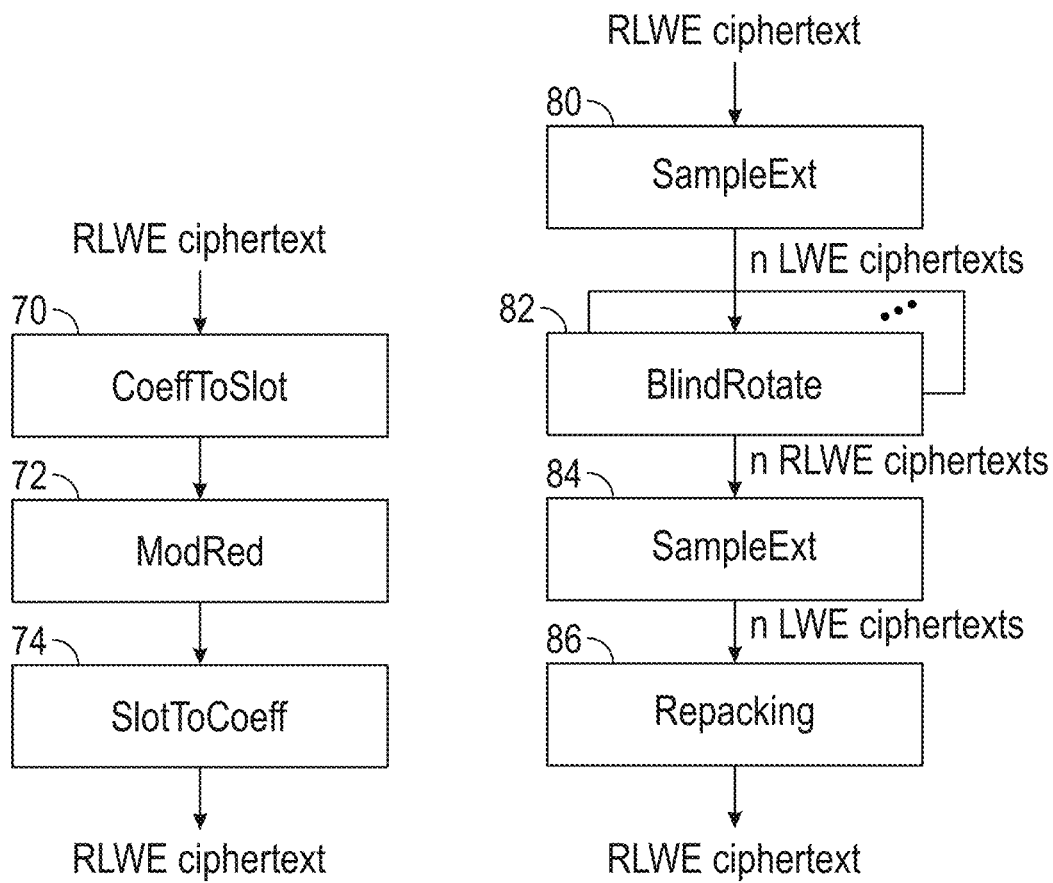
FIG. 6A  FIG. 6B

Algorithm 3 CKKS-Bootsrapping($ct = (a,b) \in R_q^2$)

1: $ct' \leftarrow 2N \cdot ct \pmod{q} \in R$ {ModulusSwitch to 2N}

2: $ct_{ms} \leftarrow (\frac{2N \cdot ct - ct'}{q}) \in R_{2N}$ {ModulusSwitch to q}

3: $ct_{kq} \leftarrow$ BlindRotate (Extract ($ct_{ms}, q, Qp$)) $\in R_{Qp}$ {SampleExtraction followed by BlindRotate}

4: $ct'' \leftarrow ct_{kq} + ct' \pmod{Qp} \in R_{Qp}$ {Subtraction kq from ciphertext}

5: $ct_{boot} =$ Rescale ($\frac{p}{2N} \cdot ct'', p) \in R_Q$ {ModulusSwitch to Q, SampleExtraction, and Repacking}

6: return $ct_{boot} = (a_{boot}, b_{boot}) \in R^2_Q$

FIG. 7

COMPUTING SYSTEM FOR FULLY HOMOMORPHIC ENCRYPTION APPLICATIONS USING PARALLELIZABLE HYBRID BOOTSTRAPPING

BACKGROUND

The invention is generally related to the field of hardware accelerator devices for computing applications, in particular for systems employing fully homomorphic encryption (FHE) for data protection.

SUMMARY

A computing system is disclosed having one or more accelerator devices for hardware acceleration of operations of a fully homomorphic encryption (FHE) application, with features including a hybrid bootstrapping operation that may be parallelized for increased performance. Hybrid bootstrapping includes a first extraction on a first ciphertext (e.g., Ring Learning with Errors or RLWE) to form a plurality of second ciphertexts (e.g., LWE) corresponding to respective elements of the encrypted data, and a plurality blind-rotate operations performed independently on the respective second ciphertexts to collectively produce a plurality of third ciphertexts (e.g., RLWE). A second extraction of respective elements of the third ciphertexts forms a plurality of fourth ciphertexts (e.g., LWE), and a repacking of respective elements of the fourth ciphertexts recreates the first-ciphertext representation of the encrypted data with restored modulus and reduced noise.

Because the blind-rotate operations are performed independently on the second ciphertexts, the technique is readily parallelizable. In one embodiment the computing system has eight parallel-arranged computing subsystems operating on respective subsets of the second ciphertext, achieving corresponding speedup over a system utilizing native, non-parallelized bootstrapping.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 5 is a simplified flow diagram of FHE application execution having an iterative nature, with a bootstrapping operation being used at each iteration;

FIG. 6A is a simplified flow diagram of a native bootstrapping operation as generally known;

FIG. 6B is a simplified flow diagram of a hybrid bootstrapping operation;

FIG. 7 is a pseudocode description of an example implementation of a hybrid bootstrapping operation.

DETAILED DESCRIPTION

Incorporation by Reference of Prior US Provisional Application ("Provisional Application")

The complete contents of U.S. Provisional Application No. 63/562,483 filed Mar. 7, 2024 are hereby incorporated by reference in their entirety. The description below includes specific references to U.S. Provisional Application No. 63/562,483 in the form of "Provisional Application, Section X", where X stands for a specific section number.

Overview

Fully Homomorphic Encryption (FHE) offers protection to private data on third-party cloud servers by allowing computations on the data in encrypted form. To support general purpose encrypted computations, existing FHE schemes require an expensive operation known as "bootstrapping." Unfortunately, the computation cost and the memory bandwidth required for bootstrapping add significant overhead to FHE-based computations, limiting the practical use of FHE.

Despite algorithmic and hardware advancements, FHE schemes continue to under-perform due to an expensive operation known as bootstrapping. Over recent years, several state-of-the-art GPU, FPGA, and ASIC designs have focused on accelerating bootstrapping. Even after these efforts, bootstrapping continues to remain a performance bottleneck by consuming about 50-80% of execution time during end-to-end application evaluations. The state-of-the-art CKKS bootstrapping algorithm is inherently sequential and exhibits interdependencies among the data. Consequently, it becomes challenging to parallelize and scale the bootstrapping algorithm to multiple CPUs/GPUs/FPGAs.

To address this issue, described herein is a technique for improving the performance of CKKS bootstrapping operation by a technique that can be parallelized and mapped to a multi-compute platform. Introduced is a hybrid scheme-switching approach that leverages the CKKS single-instruction, multiple-data (SIMD) nature to perform fundamental homomorphic operations. However, when it comes to bootstrapping, operation transitions to a hybrid scheme by extracting coefficients from a single RLWE ciphertext to represent multiple LWE ciphertexts and applying TFHE Blind Rotate operation to all LWE ciphertexts. Parallel execution (and/or more efficient batch execution) is feasible since there are no data dependencies between distinct LWE ciphertexts. In one embodiment the technique is scaled for execution in an eight-FPGA computing arrangement, which can provide on the order of 15× speedup compared to state-of-the-art single and multiple FPGA implementations.

Embodiments

Figure 1:
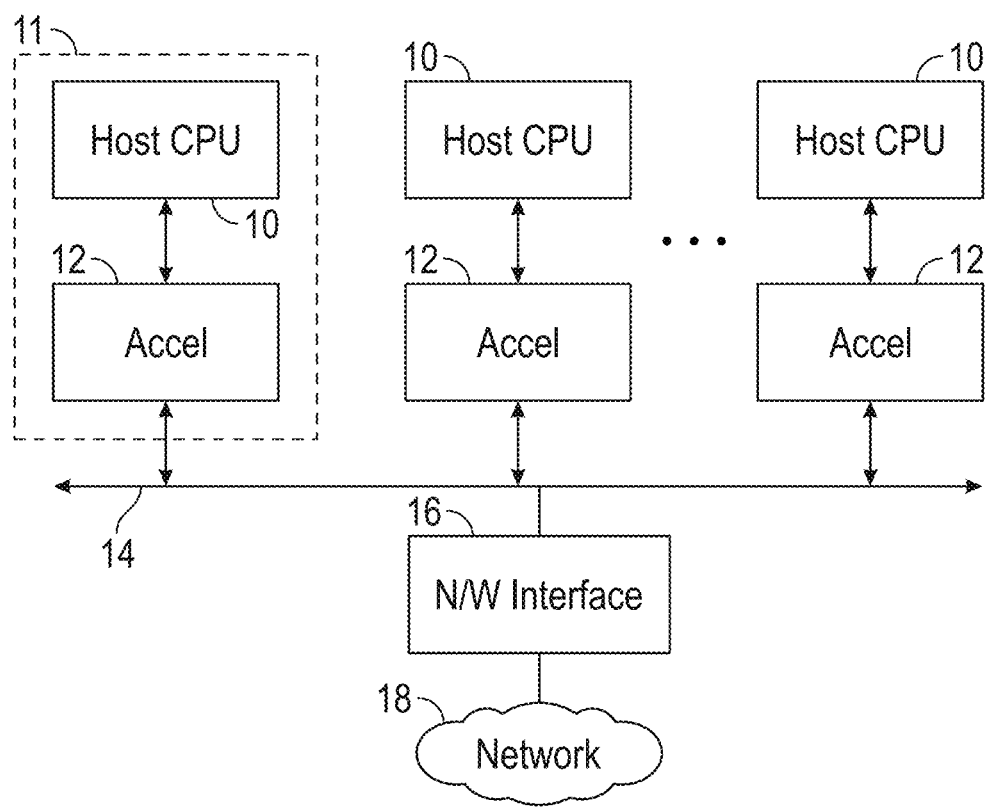
FIG. 1 is a block diagram of an example computing system having one or more FHE accelerator devices.

FIG. 1 shows an example system arrangement having a plurality of parallel-arranged computing subsystems 11 each including a respective host CPU 10 coupled via a respective bus (e.g., PCIe) to a respective FPGA-based hardware accelerator device (ACCEL) 12. The accelerator devices 12 are coupled together by a high-bandwidth system interconnection 14. A network interface 16 couples the system to an external network 18. In one embodiment the system may be realized in a so-called cloud computing platform being part of an overall client-server system architecture, an example of which is given below. In an example herein the number of parallel-arranged computing subsystems is 8, but those skilled in the art will appreciate that in any given implementation this number may be different based on a variety of factors as generally known.

In operation, a host CPU 10 executes higher-level portions of an FHE-based application, i.e., an application that utilizes and operates upon encrypted data using FHE techniques as generally known. In the system of FIG. 1, each host CPU 10 is also responsible for initialization of field-programmable element(s) of the respective accelerator device 12, i.e., downloading customization logic in hardware description language (e.g., RTL) form, as described below.

An example use of the system arrangement employs an FHE scheme referred to as "Cheon-Kim-Kim-Song" or CKKS, which is outlined briefly below and also described in more detail in the Provisional Application. Of particular relevance is the acceleration of the bootstrapping operation which is done using a hybrid scheme in place of native CKKS bootstrapping, as described more below.

Figure 2:
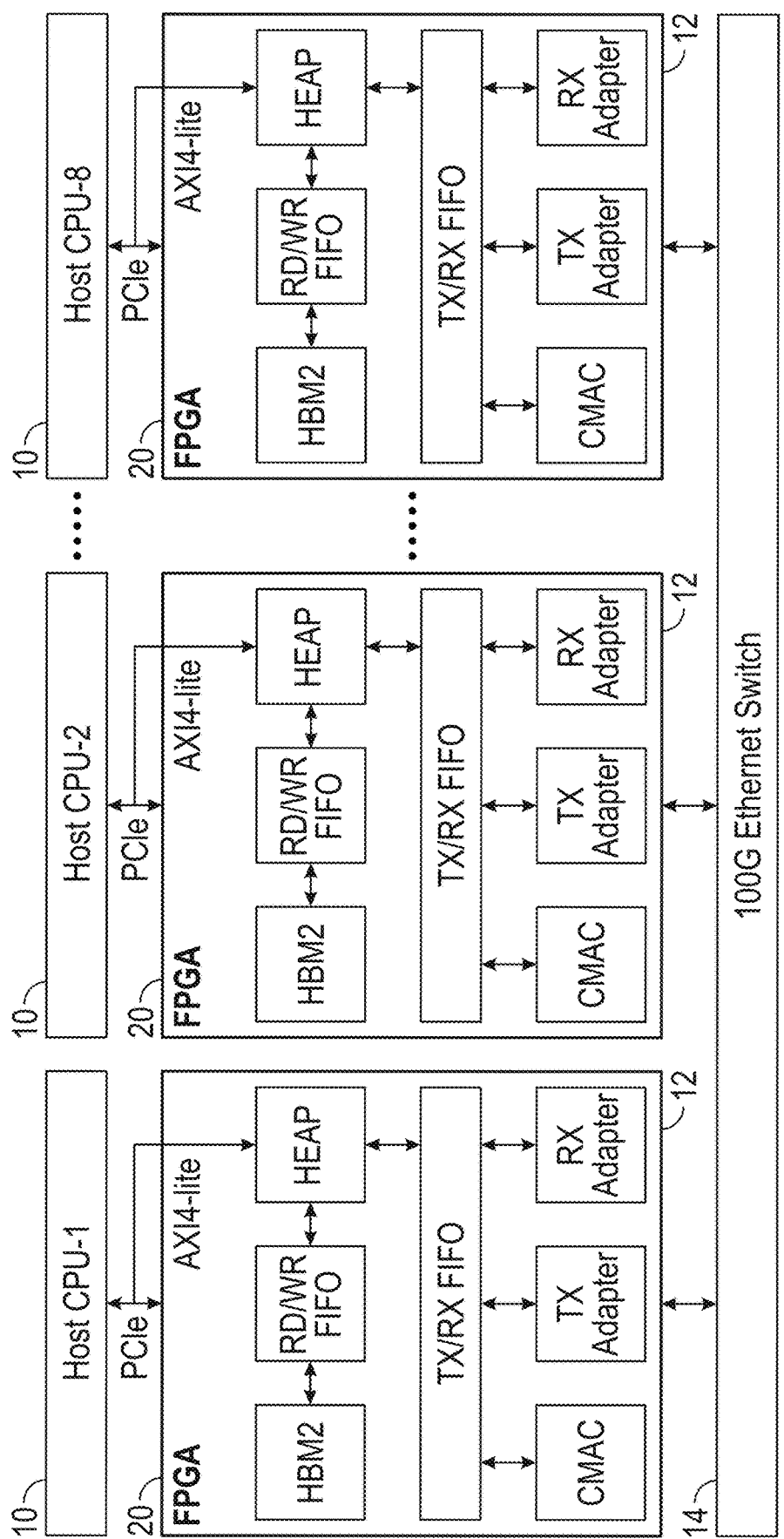
FIG. 2 is a more detailed block diagram of the example computing system.

FIG. 2 shows the system including certain details of the accelerator devices 12, shown as respective FPGAs 20. Each host CPU 10 interacts with the respective FPGA 20 via a respective PCIe bus, and each FPGA 20 interfaces to the network 14 using respective network interface components CMAC, TX Adapter and RX Adaptor. Each FPGA 20 further includes global high-bandwidth memory HBM2, FIFO buffers (Rd/WR FIFO), and a collection of processing logic shown as HEAP (Hybrid Encryption Accelerator Processor), details of which are described below.

Figure 3:
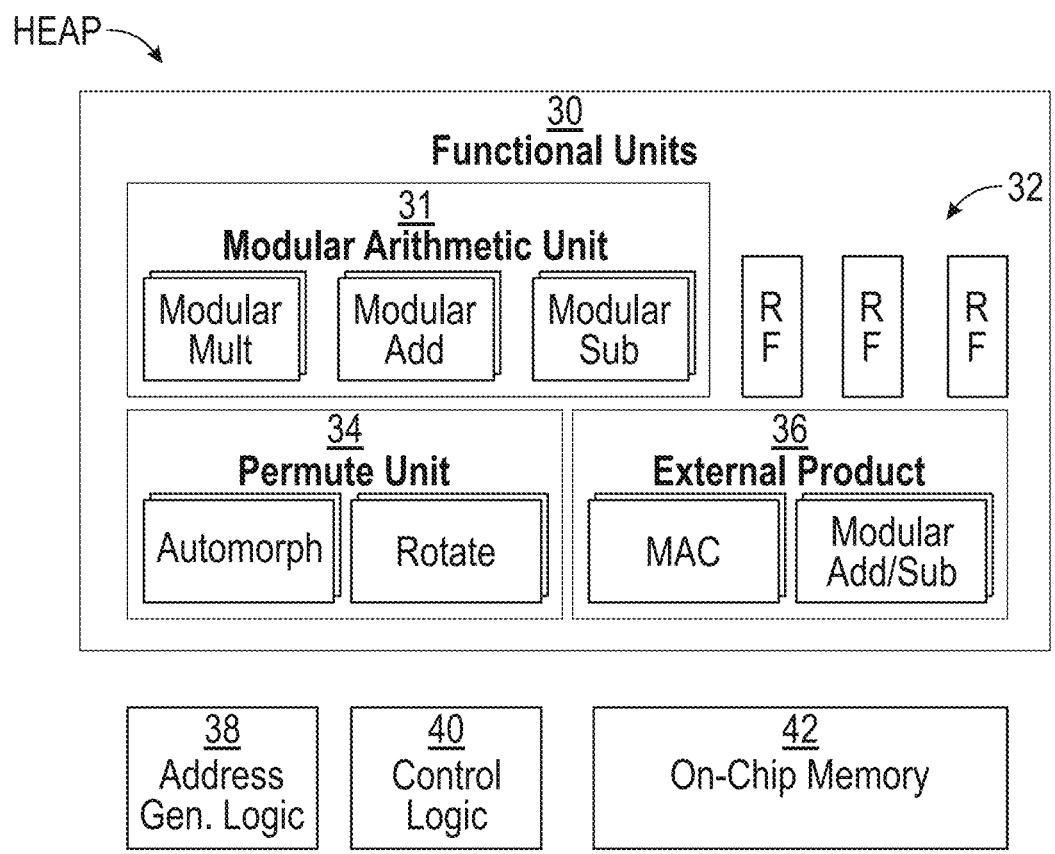
FIG. 3 is a block diagram of an example FHE accelerator device.

FIG. 3 shows the structure of the processing logic HEAP, in one example, as including a set of functional units 30, each including a modular arithmetic unit 31, register files (RFs) 32, a permute unit 34, and an external product unit 36. The HEAP also includes address generator logic 38, other control logic 40, and "on-chip" memory 42. The "on-chip" memory 42 is local, high-bandwidth, fast-access memory of a HEAP instance, as distinct from the more remote global memory HBM2 that also resides on an FPGA 20. The on-chip memory 42 may be divided into distinct single-port and dual-port memory banks, referred to herein as URAM and BRAM, respectively. As shown, the modular arithmetic unit 31 includes components for modular multiplication, addition, and subtraction; the permute unit 34 includes components for automorph and rotate; and the external product unit 36 includes MAC and modular addition/subtraction components. As indicated, the components within each of the units 31, 34 and 36 are preferably replicated for parallel processing of ciphertext limb elements and corresponding performance gain. The extent of replication depends on available hardware resources and the specific structure of the ciphertext. In one embodiment, 512 of each of these components are instantiated.

A brief description of the programming and configuration of each FPGA 20 is now provided, with reference to FIGS. 2 and 3. Overall, kernel code is downloaded and used to instantiate some number of sets (e.g., 256) of functional units 30. A register-transfer language (RTL) design of the HEAP is packaged as a kernel code which is downloaded from each host 10 to the respective FPGA 20. To enable data transfer, the host 10 allocates a buffer of the dataset size in the global memory HBM2. The host code communicates the base address of the buffer to the kernel code using atomic register reads and writes through an AXI4-Lite interface (FIG. 2). The host code also communicates all kernel arguments consisting of system parameters like prime moduli, the degree of a polynomial modulus N, and certain pre-computed scalar values (to be stored in the register file) through this interface. The kernel is started by the host code using an API call such as a Xilinx runtime (XRT) API call or OpenCL API call. Once the kernel execution starts, no data transfer occurs between the host and the global memory so as to interface all ports from the global memory HBM2 to the kernel code. The results are transferred back to the host code once the kernel execution is completed.

Additional details of the overall system organization/architecture and of the structure or "microarchitecture" of the HEAP, in one example, are described in the Provisional Application sections V and IV, respectively.

Figure 4:
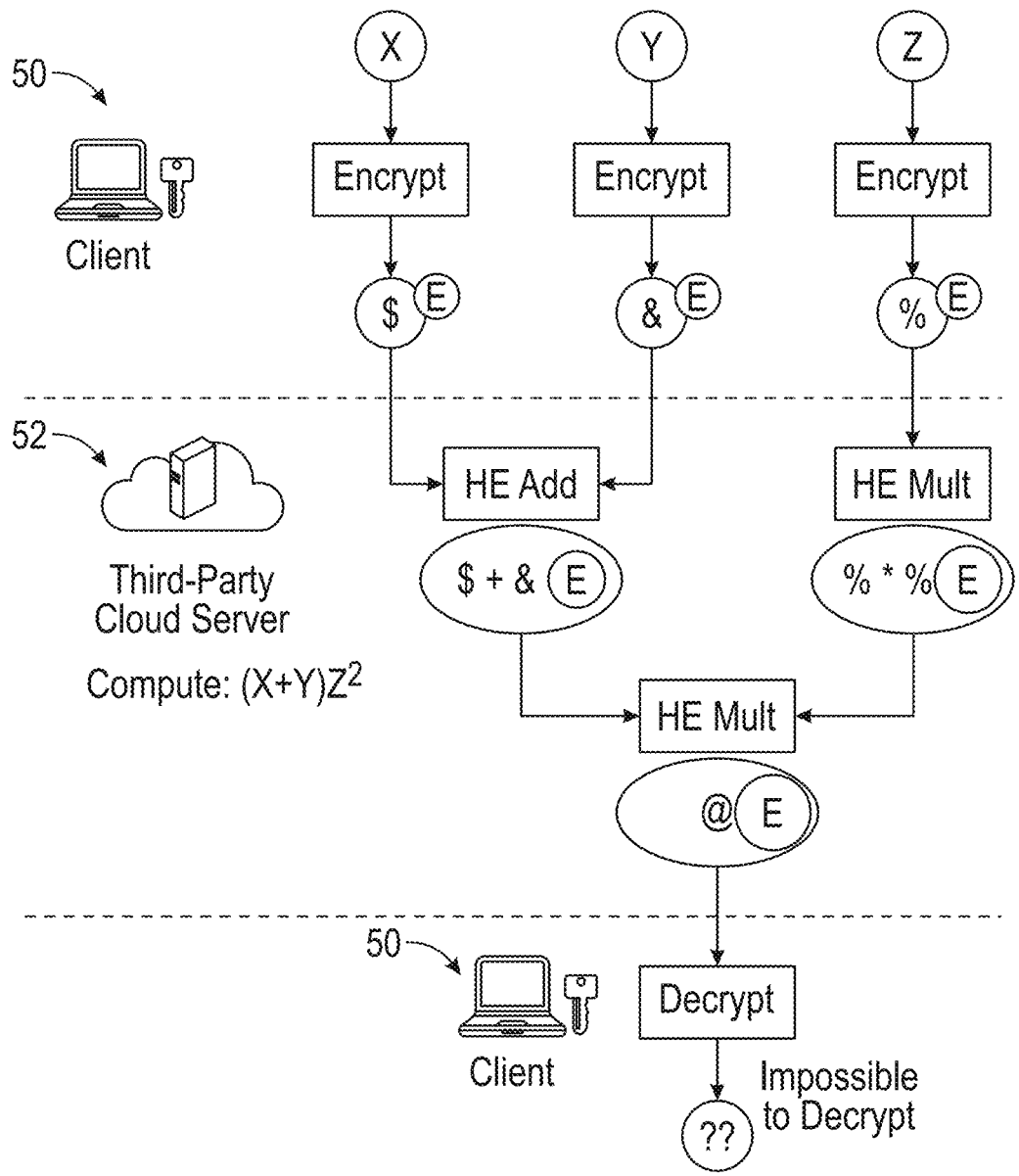
FIG. 4 is a schematic illustration of use of FHE encryption in a client-server computing environment, highlighting an increase of a noise component of the ciphertext as operations progress.

FIG. 4 is a schematic depiction of FHE-related processing at a system level. Operations are performed at both a client machine 50 and at server 52, which may be a third-party cloud server for example. Initially, plaintext data items X, Y and Z are encrypted at the client 50 into corresponding ciphertexts $, & and %. Each of these ciphertexts includes some level of noise shown as bubbles "E," which results from the homomorphic encryption. The relatively small size of the E bubbles indicates that the noise is at a sufficiently low level that the original data may still be faithfully reproduced by decryption.

The ciphertexts are sent to server 52 which performs various homomorphic operations on the encrypted data, shown as HE ADD and HE MULT for example. These operations necessarily increase the level of noise in the results, which is indicated by the larger-size "E" bubbles. The final result is sent back to client 50 where decryption is to be applied to obtain the result in plaintext. As shown in this scenario, the noise level E is sufficiently high (large "E" bubble) that the data cannot be faithfully recovered.

FIG. 5 shows how bootstrapping is used to avoid the situation of FIG. 4, i.e., to maintain noise at a sufficiently low level such that faithful decryption is possible. As shown, operation iterates between periods 60 of regular operations (e.g., FHE primitive and rescale operations, for evaluating expressions etc. such as in FIG. 4) and interspersed bootstrapping operations 62. As known, bootstrapping serves to "refresh" the ciphertext, reducing noise so that operations can continue and provide an encrypted result that can be faithfully decrypted.

FIGS. 6A and 6B are high-level flow diagrams for conventional or native CKKS bootstrapping and improved hybrid bootstrapping, respectively. CKKS uses a ciphertext representation based on the Ring Learning With Errors (RLWE) computation problem. As shown, both bootstrapping techniques take the RLWE ciphertext as input and provide a bootstrapped RLWE ciphertext as output. In CKKS, the encryption of a plaintext m results in a ciphertext ct=(a, b), which is an RLWE ciphertext consisting of a pair of polynomials in a polynomial ring.

In the native bootstrapping of FIG. 6A, the RLWE ciphertext is first converted at 70 from a coefficient representation to a slot representation, then at 72 a modulus reduction (ModRed) operation is performed. "Slot" refers to a position of an element of a ciphertext in "slot" or "evaluation" representation. The ModRed result is then converted back into coefficient representation at 74. A significant limitation of the ModRed operation 72 is its inherent non-parallelizability. In FHE systems it is common to employ a limb-based representation of ciphertext (as described in the Provisional Application) so that practical computing hardware can tractably operate in a limb-wise manner. The large ciphertext polynomial is decomposed into an equivalent representation by smaller polynomials, referred to as "limbs," using a residue number system (RNS). The ModRed operation 72 includes an expensive number theoretic transform (NTT and inverse-NTT (iNTT) transform in which there are computational dependencies across limbs and across slots of the limbs. There is no clean division of data and operations that can be used for parallelization.

FIG. 6B shows the hybrid bootstrapping technique that avoids these problems of the native bootstrapping technique of FIG. 6A. At 80, a first extraction (SampleExt) is performed to generate a number n LWE ciphertexts from the input RLWE ciphertext. Here, n is the number of elements in the original plaintext message, and the extraction effects a segregation of ciphertext components that can be operated on in parallel. At 82, a set of n "blind rotate" operations are performed on the respective LWE ciphertexts, an operation which is parallelizable as the blind rotate operations can be performed independently of each other. Blind rotate produces n RLWE ciphertexts, which are then subject to a second extraction (SampleExt) at 84 to produce n LWE ciphertexts, from which the bootstrapped RLWE ciphertext is produced by a repacking operation 86. Blind rotation is a particular way of performing bootstrapping that involves manipulation of ciphertext coefficients, and it isolates a noise component kq which can then be removed by subsequent processing. Extraction forms LWE ciphertexts by extracting specific predetermined terms (i.e., a constant term) from each of the input RLWE ciphertexts. Details are described in the Provisional Application section II (B) (TFHE Scheme).

In practice n is a power-of-two value much larger than the number of computation units available in the system. Assuming a number b of such computation units (e.g., b=8 in the example of FIGS. 1 and 2), the n RLWE ciphertexts can be distributed in n/b subsets among the b computation units for b-way parallel processing, obtaining corresponding speedup over the single-stream processing in the native bootstrapping of FIG. 6A.

FIG. 7 is a pseudocode description of hybrid CKKS bootstrapping utilizing the technique of FIG. 6B. At step 1 the modulus of the input ciphertext et is increased to 2N, and at step 2 the modulus is switched to q. Step 3 includes both the extraction 80 and blind rotate operations 82 of FIG. 6B. Step 4 is a noise reduction operation, subtracting a noise component kq from the ciphertext. Step 5 includes modulus switching back to the original modulus Q along with the extraction and repacking steps 84, 86 of FIG. 6B, and step 6 returns the bootstrapped ciphertext $ct_{boot}$.

The individual features of the various embodiments, examples, and implementations disclosed within this document can be combined in any desired manner that makes technological sense. Furthermore, the individual features are hereby combined in this manner to form all possible combinations, permutations, and variants except to the extent that such combinations, permutations, and/or variants have been explicitly excluded or are impractical. Support for such combinations, permutations and variants is considered to exist within this document.

While various embodiments of the invention have been particularly shown and described, it will be understood by those skilled in the art that various changes in form and details may be made therein without departing from the scope of the invention as defined by the appended claims.

What is claimed is:

1. A computing system having one or more accelerator devices for hardware acceleration of operations of a fully homomorphic encryption (FHE) application, each of the accelerator devices including:
    an interface to a respective host CPU configured to execute the FHE application using the accelerator device for FHE operations including (1) primitive and rescale operations on encrypted data represented as a first ciphertext subject to modulus reduction and noise increase as FHE operations progress, and (2) a hybrid bootstrapping operation performed periodically for restoring modulus and reducing noise in the first ciphertext, the first ciphertext being a ring-based ciphertext for which native bootstrapping is non-parallelizable;
    on-chip memory for storing operands and results of the FHE operations; and
    FHE processing circuitry configured and operative to perform the FHE operations including, in the hybrid bootstrapping operation:
        a first extraction on the first ciphertext to form a plurality of second ciphertexts corresponding to respective elements of the encrypted data;
        a plurality of blind-rotate operations each performed independently on a respective one of the second ciphertexts to collectively produce a plurality of third ciphertexts;
        a second extraction of respective elements of the third ciphertexts to form a plurality of fourth ciphertexts; and
        a repacking of respective elements of the fourth ciphertexts to recreate the first-ciphertext representation of the encrypted data with restored modulus and reduced noise.

2. The computing system of claim 1, wherein the number of accelerator devices is two or more, and wherein each of the accelerator devices performs a respective subset of the blind-rotate operations on a respective subset of the second ciphertexts.

3. The computing system of claim 2, wherein the number of second ciphertexts is a number n equal to a number of elements of plaintext data from which the encrypted data is formed, and the number of accelerator devices is b, and each of the accelerator devices operates on a respective number n/b of the second ciphertexts.

4. The computing system of claim 2, wherein the accelerator devices are coupled together by a high-speed interconnection for transfer of data therebetween.

5. The computing system of claim 1, wherein the number of accelerator devices is one, and the blind-rotate operations are performed by the accelerator device in individual independent batches for the respective second ciphertexts.

6. The computing system of claim 1, wherein:
    the first ciphertext is a ring learning with errors (RLWE) ciphertext;
    the second ciphertexts are learning with errors (LWE) ciphertexts corresponding to respective components of the first ciphertext;
    the third ciphertexts are RLWE ciphertexts formed by terms in predetermined positions of the second ciphertexts; and
    the fourth ciphertexts are RLWE ciphertexts formed by terms in predetermined positions of the third ciphertexts.

7. The computing system of claim 1, wherein the hybrid bootstrapping operation further includes a noise reduction step and modulus-switching steps, the noise reduction subtracting a noise component from the third ciphertexts, the modulus switching steps including (i) a modulus increasing step applied to the first ciphertext prior to the first extraction, and (ii) a modulus decreasing step applied to the third ciphertexts after noise reduction.

8. The computing system of claim 1, wherein each of the accelerator devices includes a respective plurality of functional elements, each functional element including a respective portion of the on-chip memory and a respective processing element being one of a plurality of processing elements that constitute the FHE processing circuitry.

9. The computing system of claim 8, wherein each of the functional elements includes a modular arithmetic unit, a set of register files, a permute unit, an external product unit, address generator logic, other control logic, and the respective portion of on-chip memory.

10. The computing system of claim 8, wherein the number of functional elements on each of the accelerator devices is 32 or more.

11. The computing system of claim 8, wherein each of the accelerator devices includes respective global memory coupled to the functional units for data transfer therewith.

\* \* \* \* \*